United States Patent
Carnevali

(10) Patent No.: US 11,277,506 B2
(45) Date of Patent: Mar. 15, 2022

(54) CRADLES FOR MOBILE DEVICES WITH ONE OR MORE BIASING TABS AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 16/883,743

(22) Filed: May 26, 2020

(65) Prior Publication Data

US 2021/0377378 A1    Dec. 2, 2021

(51) Int. Cl.
*H04M 1/06* (2006.01)

(52) U.S. Cl.
CPC ..................... *H04M 1/06* (2013.01)

(58) Field of Classification Search
CPC ............ H04M 1/08; H04M 1/10; H04M 1/12; H04M 1/14; H04M 1/15; H04M 1/06
See application file for complete search history.

(56) References Cited

U.S. PATENT DOCUMENTS

| | | |
|---|---|---|
| 809,977 A | 1/1906 | O'Brien |
| 1,786,459 A | 7/1926 | Simons |
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS

Certified English Translation of Chinese Published Patent Disclosure No. CN 1312603A ("Huang") (Foreign reference previously cited).

(Continued)

*Primary Examiner* — Ankur Jain
*Assistant Examiner* — Angelica M Perez
(74) *Attorney, Agent, or Firm* — Branch Partners PLLC; Bruce E. Black

(57) ABSTRACT

A cradle for a mobile device includes a base; sidewalls extending from the base and defining, in combination with the base, a cavity for receiving the mobile device; at least one contact extending out of the base; and at least one biasing tab. Each of the at least biasing tab includes a first portion biased to extend out of the base and arranged to engage the mobile device during loading of the mobile device prior to engagement of the at least one contact by the mobile device to protect the at least one contact during the loading of the mobile device.

19 Claims, 6 Drawing Sheets

(56) References Cited

U.S. PATENT DOCUMENTS

| | | |
|---|---|---|
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,457,745 A | 10/1995 | Wang |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,888,087 A | 3/1999 | Hanson et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,191,943 B1 | 2/2001 | Tracy |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,438,229 B1 | 8/2002 | Overy et al. |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,203,058 B2 | 4/2007 | Hong |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| RE42,060 E | 1/2011 | Carnevali |
| 7,889,489 B2 | 2/2011 | Richardson et al. |
| 7,901,216 B2 | 3/2011 | Rohrbach et al. |
| 7,907,394 B2 | 3/2011 | Richardson et al. |
| 7,970,440 B2 | 6/2011 | Bury |
| 8,061,516 B2 | 11/2011 | Carnevali |
| 8,074,951 B2 | 12/2011 | Carnevali |
| 8,087,939 B2 | 1/2012 | Rohrbach et al. |
| 8,099,138 B2 | 1/2012 | Piekarz |
| 8,172,580 B1 | 5/2012 | Chen et al. |
| 8,177,560 B2 | 5/2012 | Rohrbach et al. |
| 8,183,825 B2 | 5/2012 | Sa |
| 8,224,408 B2 | 7/2012 | Tomasini et al. |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,483,758 B2 | 7/2013 | Huang |
| 8,497,753 B2 | 7/2013 | DiFonzo et al. |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,833,716 B2 | 9/2014 | Funk et al. |
| 8,891,800 B1 | 11/2014 | Shaffer |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,026,187 B2 | 5/2015 | Huang |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,147,966 B2 | 9/2015 | An |
| 9,172,781 B1 | 10/2015 | Goldstein |
| 9,356,267 B1 | 5/2016 | To et al. |
| 9,602,639 B2 | 3/2017 | Carnevali |
| 9,647,474 B2 | 5/2017 | Fathollahi et al. |
| 9,776,577 B2 | 10/2017 | Carnevali |
| 9,924,005 B1 | 3/2018 | McElderry |
| 10,172,246 B2 | 1/2019 | Apter |
| 10,330,251 B2 | 6/2019 | Carnevali |
| 10,401,905 B2 | 9/2019 | Carnevali |

(56) References Cited

U.S. PATENT DOCUMENTS

| | | | |
|---|---|---|---|
| 10,714,953 B1* | 7/2020 | Solana | H02J 7/0044 |
| 11,029,731 B1 | 6/2021 | Carnevali | |
| 11,076,032 B1 | 7/2021 | Carnevali | |
| 2002/0009194 A1 | 1/2002 | Wong et al. | |
| 2002/0191782 A1 | 12/2002 | Beger et al. | |
| 2003/0068986 A1* | 4/2003 | Oh | B60R 11/0241 |
| | | | 455/90.1 |
| 2003/0116631 A1 | 6/2003 | Salvato et al. | |
| 2004/0108348 A1 | 6/2004 | Barnes | |
| 2005/0189354 A1 | 9/2005 | Heather et al. | |
| 2006/0058073 A1 | 3/2006 | Kim | |
| 2006/0175766 A1 | 8/2006 | Carnevali | |
| 2008/0149796 A1 | 6/2008 | Moscovitch | |
| 2008/0273734 A1* | 11/2008 | Solland | H04R 1/02 |
| | | | 381/334 |
| 2009/0160400 A1 | 6/2009 | Woud | |
| 2009/0314400 A1 | 12/2009 | Liu | |
| 2012/0018325 A1 | 1/2012 | Kim | |
| 2012/0043235 A1 | 2/2012 | Klement | |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0331156 A1 | 12/2013 | Lui | |
| 2013/0334071 A1 | 12/2013 | Carnevali | |
| 2014/0042285 A1 | 2/2014 | Carnevali | |
| 2014/0347000 A1 | 11/2014 | Hamann et al. | |
| 2014/0363988 A1 | 12/2014 | An | |
| 2015/0055289 A1 | 2/2015 | Chang et al. | |
| 2015/0146401 A1 | 5/2015 | Su et al. | |
| 2015/0189780 A1 | 7/2015 | Su et al. | |
| 2016/0065702 A1 | 3/2016 | Carnevali | |
| 2016/0231779 A1 | 8/2016 | Kaneko et al. | |
| 2017/0054312 A1 | 2/2017 | Kuchynka et al. | |
| 2017/0227987 A1 | 8/2017 | Carnevali et al. | |
| 2018/0279809 A1 | 10/2018 | Regan et al. | |
| 2018/0314296 A1* | 11/2018 | Evans, V | H03M 1/66 |
| 2020/0330037 A1* | 10/2020 | Al-Ali | A61B 5/0006 |
| 2021/0048848 A1* | 2/2021 | Pischel | G06F 1/1656 |
| 2021/0194256 A1 | 6/2021 | Carnevali | |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

Officeonthego.com, 3 pages of product description of Magnifico ©PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

* cited by examiner

CRADLES FOR MOBILE DEVICES WITH ONE OR MORE BIASING TABS AND METHODS OF MAKING AND USING

FIELD

The present invention is directed to cradles for a mobile device. The present invention is also directed to a cradle for a mobile device that includes at least one biasing tab to facilitate loading the mobile device into the cradle.

BACKGROUND

Mobile devices, such as smartphones, cellular or mobile phones, tablets, personal data assistants, and other portable devices, are now ubiquitous. Cradles can be used to protect the mobile device and to mount the mobile device onto a surface or object.

BRIEF SUMMARY

One embodiment is a cradle for a mobile device. The cradle includes a base; sidewalls extending from the base and defining, in combination with the base, a cavity for receiving the mobile device; at least one contact extending out of the base; and at least one biasing tab. Each of the at least biasing tab includes a first portion biased to extend out of the base and arranged to engage the mobile device during loading of the mobile device prior to engagement of the at least one contact by the mobile device to protect the at least one contact during the loading of the mobile device.

In at least some embodiments, the at least one biasing tab includes at least two biasing tabs flanking the at least one contact. In at least some embodiments, a maximum distance that the first portion of each of the at least one biasing tab extends out of the base is greater than a maximum distance that the at least one contact extends out of the base. In at least some embodiments, the at least one biasing tab is aligned in the cradle with the at least one contact.

In at least some embodiments, the at least one contact and the at least one biasing tab are disposed nearer a first end of the base than a second end of the base, where the first end is opposite the second end. In at least some embodiments, in the absence of a mobile device in the cradle, the first portion of each of the at least one biasing tab is sloped toward the second end of the base. In at least some embodiments, each of the at least one biasing tab is coupled to the base and is arranged to flex relative to the base to provide biasing. In at least some embodiments, each of the at least one contact is a biasing contact biased to extend out of the base.

In at least some embodiments, the base and sidewalls define a cup for receiving a lower portion of the mobile device during loading of the mobile device into the cradle.

In at least some embodiments, the cradle further includes a roller latch configured to extend, in part, over the mobile device when loaded into the cradle to retain the mobile device in the cradle. In at least some embodiments, the roller latch includes a flex arm coupled to the base or at least one of the sidewalls and configured to flex relative to the base or the at least one of the sidewalls to which the flex arm is coupled to facilitate loading and unloading of the mobile device from the cradle. In at least some embodiments, the roller latch further includes a roller coupled to the flex arm by at least two legs. In at least some embodiments, the roller is configured to rotate relative to the flex arm.

In at least some embodiments, the cradle further includes a locking mechanism configured to lock the mobile device in the cradle by engaging the flex arm to resist flexing of the flex arm. In at least some embodiments, the locking mechanism includes a moveable plunger configured to move between a lock position and an unlock position, wherein, in the lock position, the plunger engages the flex arm. In at least some embodiments, the flex arm includes a protrusion that is configured to be engaged by the plunger in the lock position. In at least some embodiments, the locking mechanism is configured to receive a tool to lock and unlock the plunger from the lock position.

In at least some embodiments, the base defines an enclosure for receiving at least one battery, wherein the at least one contact is configured for electrical coupling to the at least one battery when the at least one battery is received in the enclosure. In at least some embodiments, the cradle further includes a connector configured for electrically coupling to the at least one battery when the at least one battery is received in the enclosure and for electrically coupling to an external power or data source.

In at least some embodiments, the cradle further includes a connector electrically coupled to the at least one contact for electrically coupling to an external power or data source.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
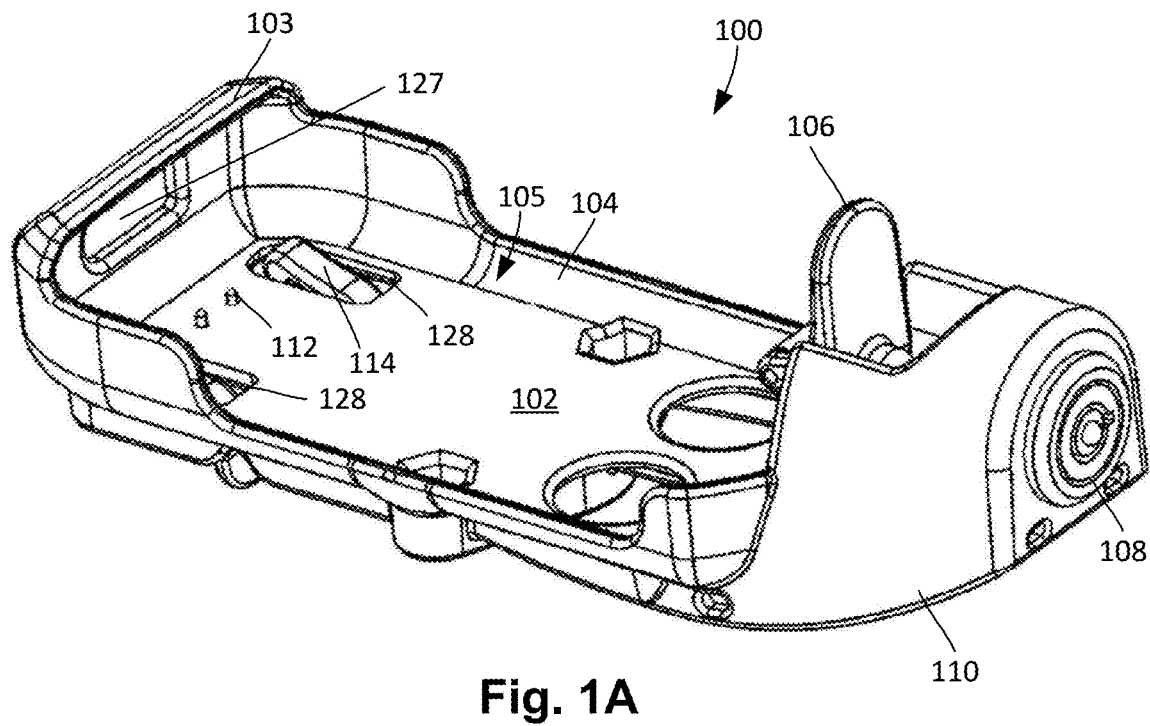
FIG. 1A is a schematic perspective view of a first embodiment of a cradle for a mobile device, according to the invention.
Figure 1B:
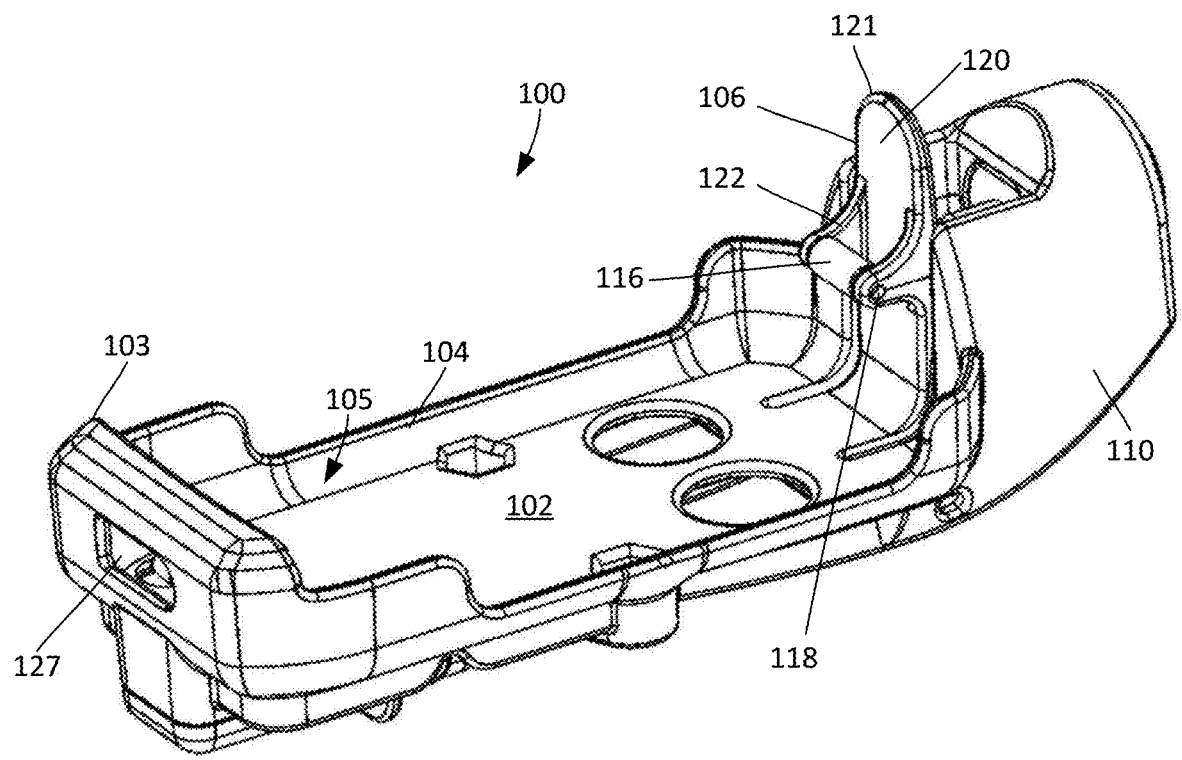
FIG. 1B is a schematic perspective view of the cradle of FIG. 1A from a different angle, according to the invention.

The present invention is directed to cradles for a mobile device. The present invention is also directed to a cradle for a mobile device that includes at least one biasing tab to facilitate loading the mobile device into the cradle.

FIGS. 1A to 1D illustrate one embodiment of a cradle 100 for a mobile device, such as a cellular or mobile phone, a smartphone, a tablet, a personal data assistant, or any other suitable mobile device. FIGS. 2A and 2B illustrate a mobile device 230 in the cradle 100. The cradle 100 includes a base 102, sidewalls 104 extending from the base to define a cavity 105 for receiving the mobile device 230, a roller latch 106 extending from the base, a locking mechanism 108, and lock housing 110 disposed around the locking mechanism and coupled to the base. In at least some embodiments, the sidewalls 104 form a cup 103 for receiving a lower portion of the mobile device 230. The cradle 100 also includes contacts 112 extending out of the base 102 for coupling to contacts on the mobile device 230 or a case of the mobile device, as well as one or more biasing tabs 114 extending out of the base for protecting the contacts 112 during insertion of the mobile device 230 into the cradle 100.

Figure 1C:
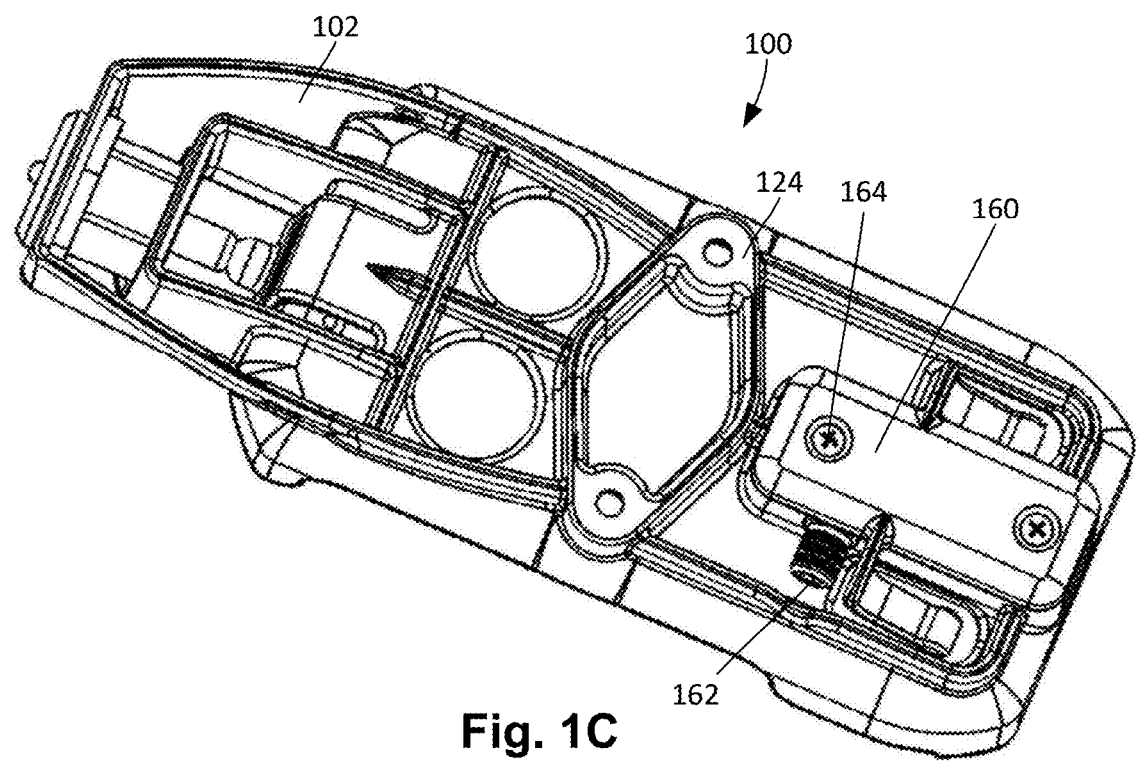
FIG. 1C is a schematic perspective bottom view of the cradle of FIG. 1A, according to the invention.
Figure 2A:
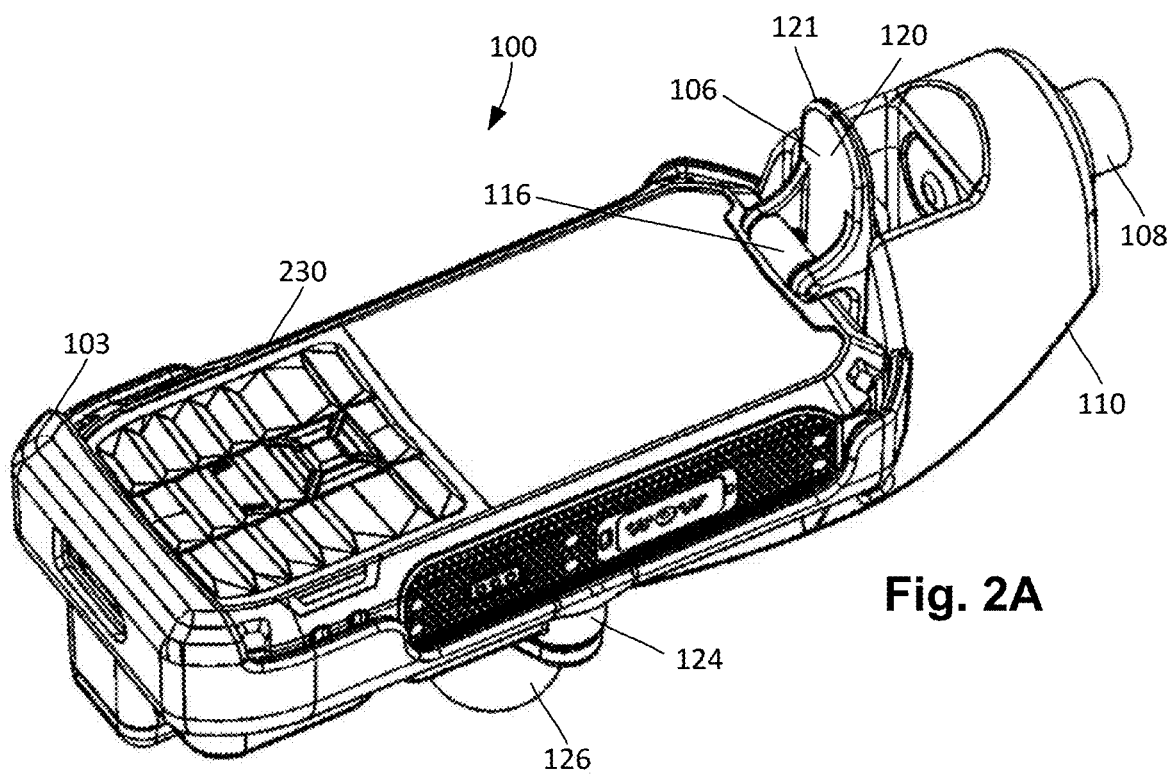
FIG. 2A is a schematic perspective view of the case of FIG. 1A with a mobile device inserted into the cradle, according to the invention.
Figure 2B:
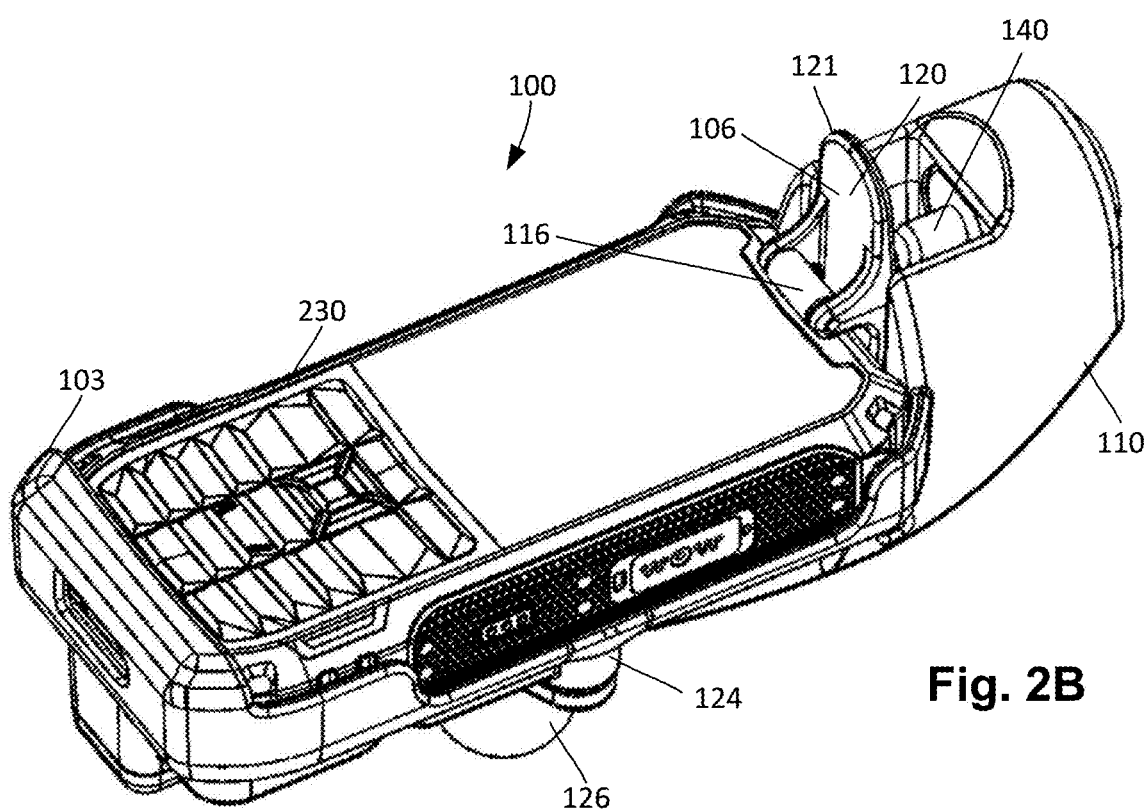
FIG. 2B is a schematic perspective view of the case of FIG. 1A with a mobile device inserted into the cradle and a plunger of the cradle in a lock position, according to the invention.

As illustrated in FIG. 1C, the cradle 100 may also include a mounting arrangement 124 for attachment to a mounting device or surface or other article. FIGS. 2A and 2B illustrate one embodiment of a mounting device in the form of a mounting ball 126. Non-limiting examples of mounting devices can be found at U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference.

The base 102 and sidewalls 104 of the cradle 100 can be made from any suitable material including, but not limited to, plastics or other polymeric materials. In at least some embodiments, the base 102 and sidewalls 104 of the cradle are preferably rigid or slightly flexible to the user. In at least some embodiments, the length and width of the base 102, the depth the cup 103, and the length and depth (i.e., the distance from the base to the opposite edge of the sidewall) of the sidewalls 104 are selected to hold a particular mobile device 230 or set of mobile devices of similar length, width, and depth dimensions. The cup 103 and, at least in some embodiments, the sidewalls 104 facilitate retention of the mobile device 230 in the cradle. In some embodiments, portions of the sidewalls 104 may be lower than other adjacent portions or even absent to permit access to buttons or other items on the mobile device 230. In at least some embodiments, the cup 103 can include an opening 127 which may provide access to a button, port, speaker, microphone, or the like on the bottom of the mobile device 230.

In at least some embodiments, the roller latch 106 includes a roller 116 rotating on an axle 118 that is coupled to a flex arm 120 by two legs 122. The flex arm 120 is coupled to the base 102 (or alternatively one or more of the sidewalls 104) and can flex relative to the base (or sidewall(s)) during loading or unloading of the mobile device from the cradle 100 (see, for example, FIGS. 3C and 3D). The flex arm 120 is biased to retain the mobile device 230 in the cradle 100. In at least some embodiments, the roller 116 freely rotates on the axle 118 so that as the mobile device 230 is loaded in, or unloaded from, the cradle 100 the roller rotates when the mobile device contacts the roller. In at least some embodiments, when the mobile device 230 is disposed in the cradle 100 the roller 116 is disposed over a top portion of the mobile device (see, for example, FIG. 3E) due, at least in part, to the biasing of the flex arm 120. In at least some embodiments, the roller 116 engages the mobile device to facilitate retention of the mobile device in the cradle 100.

Figure 3A:
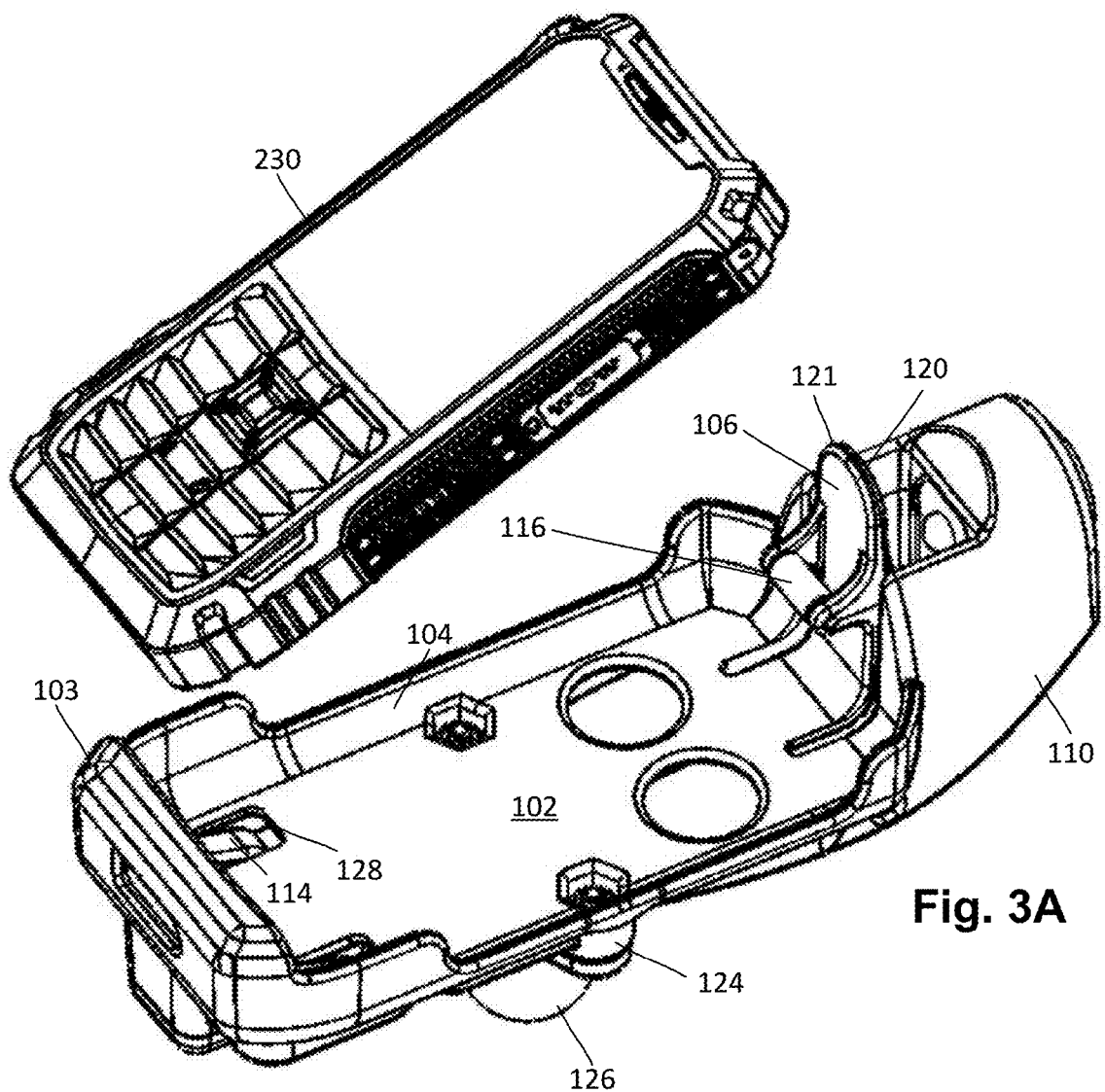
FIG. 3A is a schematic perspective view of a mobile device and the cradle of FIG. 1A prior to insertion of the mobile device into the cradle, according to the invention.
Figure 3B:
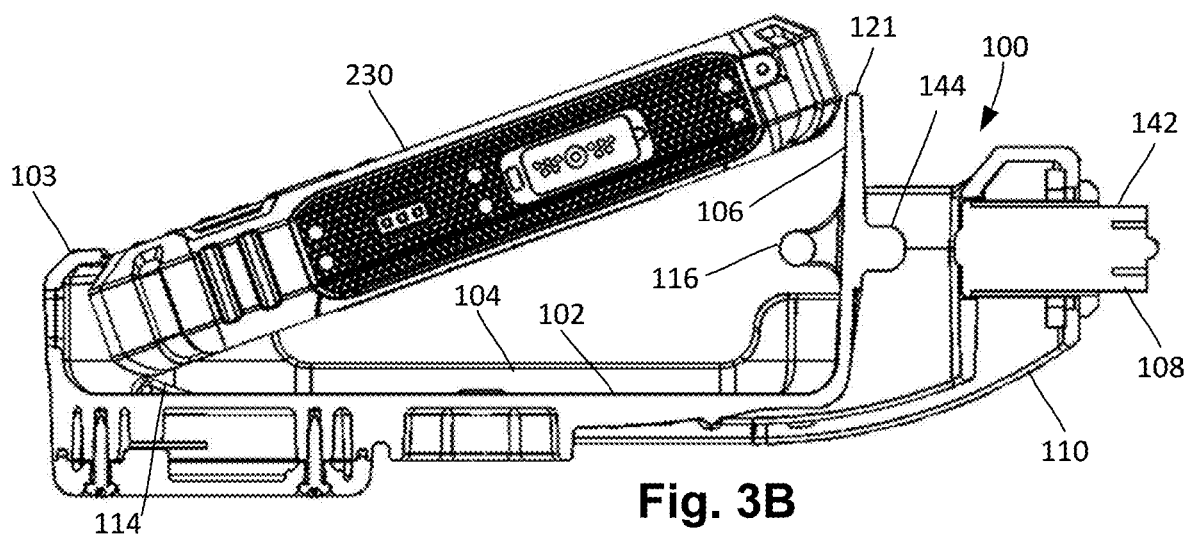
FIG. 3B is a schematic side cross-sectional view of an initial insertion of a bottom portion of the mobile device into a cup of the cradle of FIG. 1A, according to the invention.
Figure 3C:
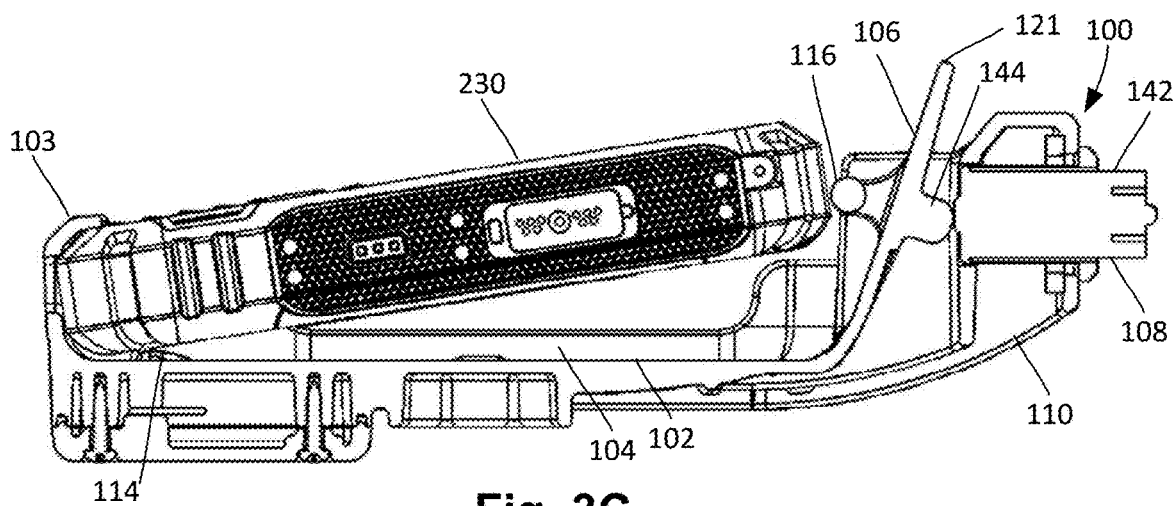
FIG. 3C is a schematic side cross-sectional view of the flexing of a flex arm of the cradle of FIG. 1A to continue the insertion of the mobile device into the cradle, according to the invention.
Figure 3D:
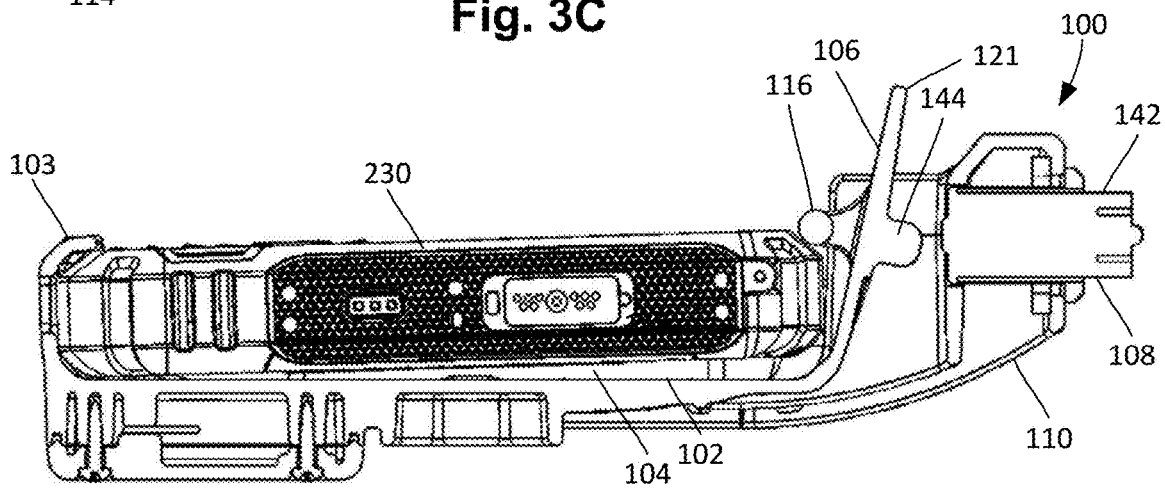
FIG. 3D is a schematic side cross-sectional view of continuing insertion of the mobile device into the cradle of FIG. 1A, according to the invention.
Figure 3E:
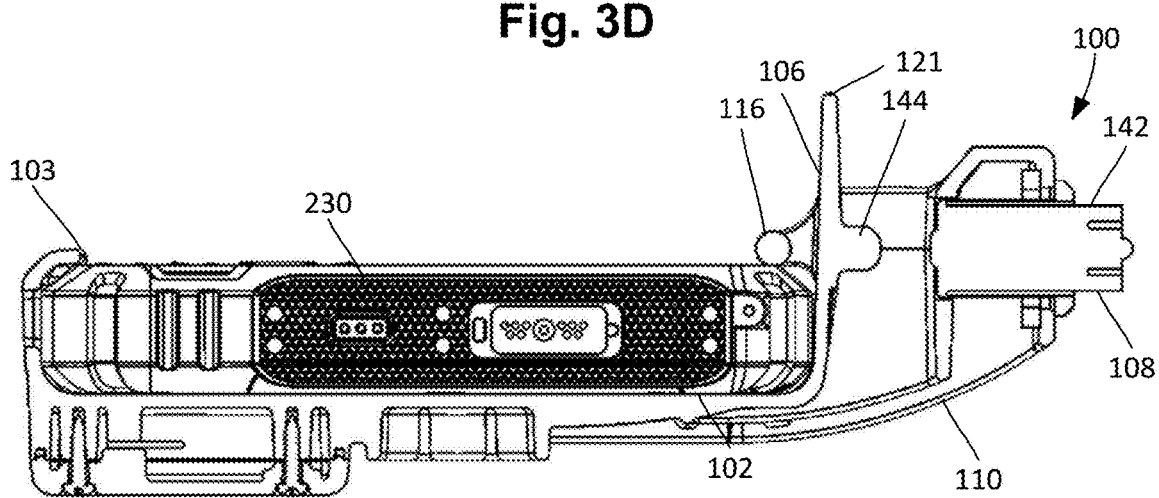
FIG. 3E is a schematic side cross-sectional view of the mobile device inserted into the cradle of FIG. 1A, according to the invention.
Figure 3F:
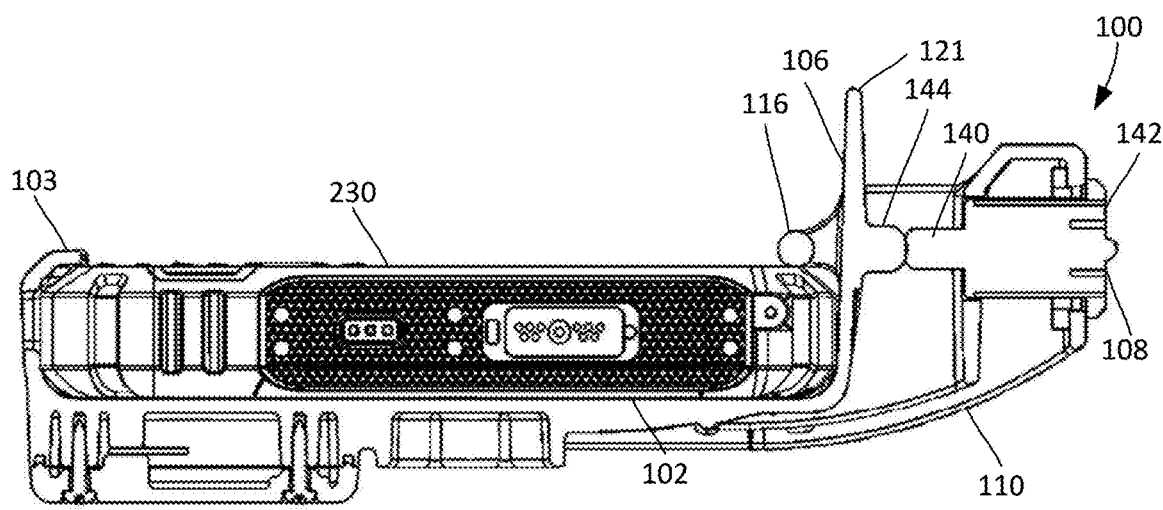
FIG. 3F is a schematic side cross-sectional view of the plunger of the cradle of FIG. 1A in the lock position to hold the mobile device in the cradle, according to the invention.

FIGS. 3A to 3E illustrate loading of the mobile device 230 into the cradle 100. In FIG. 3B, the bottom portion of the mobile device 230 is inserted at an angle into the cup 103 of the cradle 100. In FIG. 3C, the mobile device 230 pushes against the roller 116 causing the flex arm 120 to flex away from the mobile device. Alternatively or additionally, the user can manually push the top portion 121 of the flex arm 120 toward the lock housing 110 to facilitate loading the mobile device 230 into the cradle 100. In FIGS. 3D and 3E, the mobile device 230 settles into the cradle 110 and the flex arm 120, due to biasing, pushes the roller 116 over the top portion of the mobile device. In at least some embodiments, the user may manually push the top portion 121 of the flex arm 120 to set the roller 116 in place over the mobile device 230.

To unload the mobile device 230 from the cradle 100, the user can push the top portion 121 of the flex arm 120 toward the lock housing 110 to move (or disengage) the roller 116 and release the mobile device.

Figure 1D:
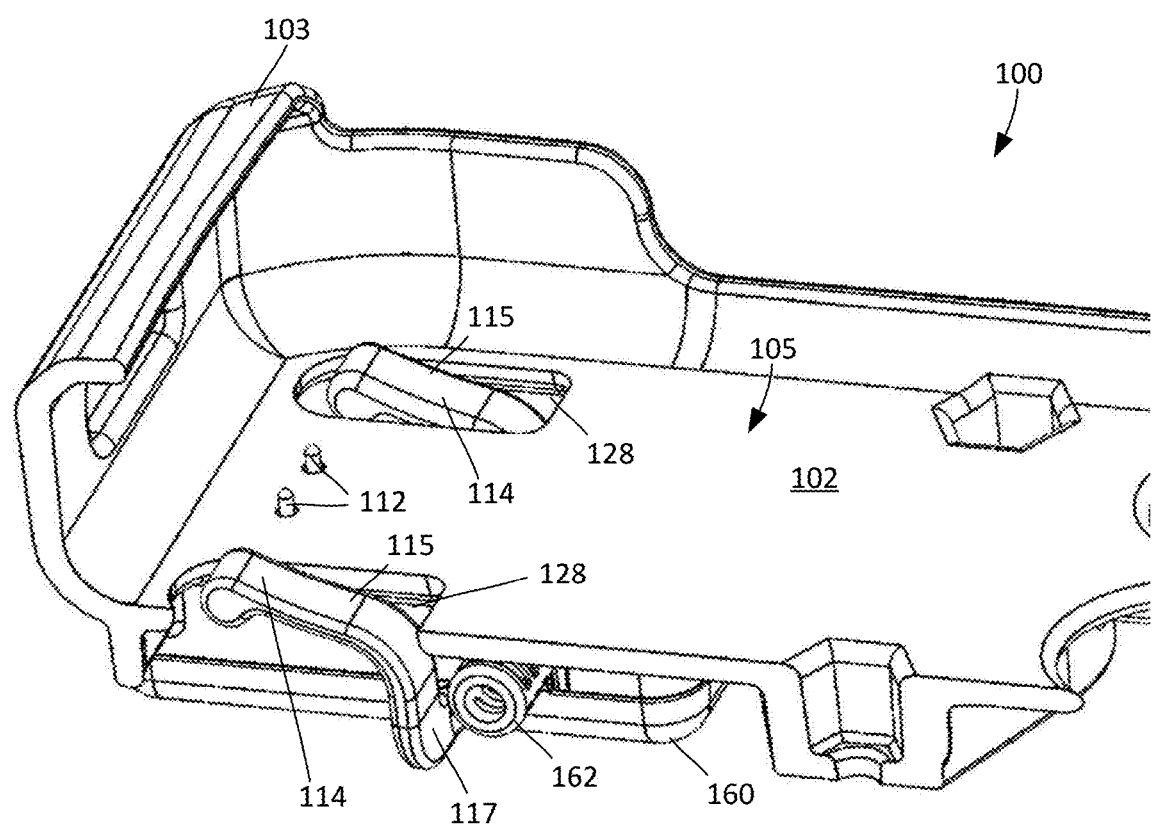
FIG. 1D is a schematic perspective cut-away view of a portion of the case of FIG. 1A, according to the invention.

The contacts 112 extend out of the base 102 of the cradle 100 as illustrated in FIG. 1D. In at least some embodiments, the contacts 112 are positioned to engage contacts on the mobile device 230 or a case of the mobile device so that power, data, or any combination thereof can be conveyed between the cradle 100 and the mobile device 230. In at least some embodiments, the contacts 112 are biasing contacts, such as spring loaded pogo pins.

In the absence of the one or more biasing tabs 114, when the mobile device 230 is loaded into the cradle 100, the angled insertion of the mobile device and subsequent angled rotation of the mobile device to its final position in the cradle, as illustrated in FIG. 3B to 3E, could damage the contacts 112 by applying a force to the contacts that could bend or break the contacts. In at least some embodiments, to protect the contacts 112, one or more biasing tabs 114 can be provided in the cradle 100. The illustrated embodiment includes two biasing tabs 114, but it will be understood that any number of biasing tabs can be used including, but not limited to, one, two, three, four, or more biasing tabs. In the illustrated embodiment, two contacts 112 are disposed between the two biasing tabs 114. Other relative arrangements of the contacts 112 and the biasing tabs 114 can be used. In at least some embodiments, at least a portion of each of the biasing tabs 114 is aligned laterally with the contacts 112, as illustrated in FIG. 1D. In other embodiments, the biasing tabs 114 may be disposed distally (e.g., toward the flex arm 120) or proximally (e.g., toward the cup 103) relative to the contacts 112.

The biasing tabs 114 are biased to extend out of one or more openings 128 in the base 102 of the cradle 100. In at least some embodiments, when a first portion 115 of the biasing tab 114 is fully extended out of the openings 128 in the base 102, the biasing tab 114 has a maximum height above the base that is higher than the maximum height that the contacts 112 extend out of the base. A second portion 117 of the biasing tabs 114 is coupled to the base 102 (see, FIG. 1C) or otherwise arranged to bias the biasing tabs to extend out of the base. In at least some embodiments, prior to engagement by the mobile device 230, the first portions 115 of the biasing tabs 114 are sloped downward toward the base 102 in a distal direction (e.g., toward the flex arm 120), as illustrated in FIG. 1D, to facilitate engagement by the mobile device 230 and the application of a downward force by the mobile device during loading. As the mobile device 230 is inserted into the cup 103 and rotated into the cradle, the mobile device engages the biasing tabs 114 and pushes the first portions 115 of the biasing tabs toward the base 102. In at least some embodiments, the biasing tabs 114 fully retract into the openings 128 in the base 102 when the mobile device 230 is fully seated in the cradle 100. In at least some embodiments, the downward slope of the biasing tabs 114 guides the mobile device in at an angle so that the mobile device 230 pushes down on the contacts 112 as the mobile device is fully seated within the cup 103.

In at least some embodiments, the contacts 112 extend into an enclosure 160 (FIG. 1C). In at least some embodiments, the enclosure 160 include one or more batteries, coupled to the contacts 112, to provide power, via the contacts, to the mobile device 230 for charging or operation. A connector 162 (FIGS. 1C and 1D) extends from the enclosure and is coupled to the batteries. An external power or data source can be coupled to the connector 162 for recharging the batteries or for conveying data to/from the mobile device or any combination thereof. The enclosure 160 can include one or more fasteners 164 (FIG. 1C) that can be removed to open the enclosure and replace the batteries. Alternatively or additionally, the contacts 112 can be coupled to the connector 162 directly for receiving power, data, or both from an external power or data source coupled to the connector. The connector 162 can be any suitable type including, but not limited to, a jack, a USB connector of any type, a Lightening connector, or any other suitable connector. As an alternative to the connector 162, a cord with a plug or connector at the end (or directly wired to a device or power source) can extend from the enclosure 160.

Figure 4A:
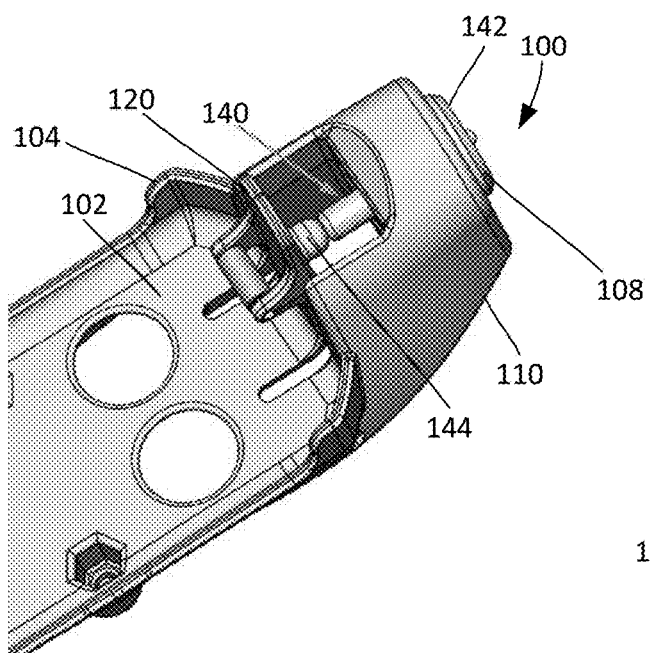
FIG. 4A is a schematic perspective close-up view of a portion of the cradle of FIG. 1A with the plunger in the lock position, according to the invention.
Figure 4B:
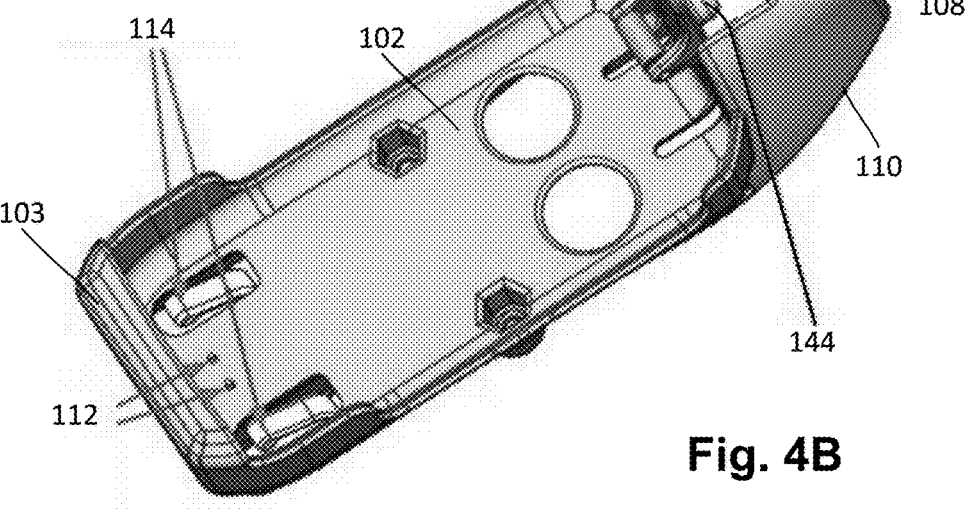
FIG. 4B is a schematic perspective view of the cradle of FIG. 1A with the plunger in the unlock position, according to the invention.

In at least some embodiments, the cradle 100 includes a locking mechanism 108 disposed in a lock housing 110, as illustrated in FIGS. 4A and 4B. The locking mechanism 108 includes a plunger 140 and a plunger housing 142. The plunger 140 can be moved from a lock position (FIG. 4A) to an unlock position (FIG. 4B).

In the lock position, the plunger 140 extends out of the plunger housing 142 and engages a portion of the flex arm 120. The engagement of the flex arm 120 prevents or hinders movement of the flex arm which then prevents or hinders withdrawal of the mobile device 230 from the cradle 100 as the flex arm and roller 115 cannot be disengaged from the mobile device 230 (and, in some embodiments, may hinder or prevent loading of the mobile device into the cradle.) In at least some embodiments, the flex arm 120 includes a protrusion 142 from the flex arm that, in the lock position, is engaged by the plunger 140. In other embodiments, the plunger 140 can engage the flex arm 120 without a protrusion.

In the unlock position, the plunger 140 retracts fully or partially into the plunger housing 142, as illustrated in FIG. 4B. When retracted, the plunger 140 does not hinder the movement of the flex arm 120 toward the lock housing 110 in order to disengage the flex arm and roller 116 from the mobile device 230 allowing the mobile device to be removed from the cradle (or loaded into the cradle.)

In at least some embodiments, the plunger 140 requires a tool, such as a key, to lock the plunger in the lock position and to release the plunger from the lock position to the unlock position. In some embodiments, the tool may be rotated or otherwise operated in the process of locking or unlocking the plunger 140 from the lock position. The use of a tool to lock the plunger may reduce the likelihood that the plunger 140 will be released due to vibration, shock, or other handling or movement of the cradle 100. In other embodiments, the plunger 140 and plunger housing 142 can be arranged so that, after pushing the plunger to the lock position, the plunger remains in the lock position until the plunger is again pushed.

Other embodiments of cradles that utilize a locking mechanism with a plunger are described in U.S. patent application Ser. No. 16/883,760 (entitled "Cradle for Mobile Devices With a Plunger Lock and Methods of Making and Using"), filed on even date herewith, incorporated herein by reference in its entirety.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A cradle for a mobile device, the cradle comprising:
a base defining a flat surface configured for receiving a back surface of the mobile device;
sidewalls extending from the base and defining, in combination with the base, a cavity for receiving the mobile device;
at least one contact extending out of the flat surface of the base;
at least one biasing tab, each of the at least one biasing tab comprising a first portion and a second portion coupled to the first portion, wherein the first portion is biased to extend out of the flat surface of the base and arranged to engage the mobile device during loading of the mobile device prior to engagement of the at least one contact by the mobile device to protect the at least one contact during the loading of the mobile device and the second portion is coupled to the base so that, as the mobile device is loaded into the cradle and engages the first portion, the first portion moves relative to the second portion; and wherein, in the absence of a mobile device in the cradle, the first portion of each of the at least one biasing tab is sloped away from the flat surface toward a first end of the base.

2. The cradle of claim 1, wherein the at least one biasing tab comprises at least two biasing tabs flanking the at least one contact.

3. The cradle of claim 1, wherein a maximum distance that the first portion of each of the at least one biasing tab extends above the flat surface of the base is greater than a maximum distance that the at least one contact extends above the flat surface of the base.

4. The cradle of claim 1, wherein the at least one biasing tab is aligned in the cradle with the at least one contact.

5. The cradle of claim 1, wherein the at least one contact and the at least one biasing tab are disposed nearer the first end of the base than a second end of the base, wherein the first end is opposite the second end.

6. The cradle of claim 1, wherein each of the at least one contact is a biasing contact biased to extend out of the base.

7. The cradle of claim 1, wherein the base and sidewalls define a cup for receiving a lower portion of the mobile device during loading of the mobile device into the cradle.

8. The cradle of claim 1, further comprising a roller latch configured to extend, in part, over the mobile device when loaded into the cradle to retain the mobile device in the cradle.

9. The cradle of claim 8, wherein the roller latch comprises a flex arm coupled to the base or at least one of the sidewalls and configured to flex relative to the base or the at least one of the sidewalls to which the flex arm is coupled to facilitate loading and unloading of the mobile device from the cradle.

10. The cradle of claim 9, wherein the roller latch further comprises a roller coupled to the flex arm by at least two legs.

11. The cradle of claim 10, wherein the roller is configured to rotate relative to the flex arm.

12. The cradle of claim 9, further comprising a locking mechanism configured to lock the mobile device in the cradle by engaging the flex arm to resist flexing of the flex arm.

13. The cradle of claim 12, wherein the locking mechanism comprises a moveable plunger configure to move between a lock position and an unlock position, wherein, in the lock position, the plunger engages the flex arm.

14. The cradle of claim 13, wherein the flex arm comprises a protrusion that is configured to be engaged by the plunger in the lock position.

15. The cradle of claim 13, wherein the locking mechanism is configured to receive a tool to lock and unlock the plunger from the lock position.

16. The cradle of claim 1, wherein the base defines an enclosure for receiving at least one battery, wherein the at least one contact is configured for electrical coupling to the at least one battery when the at least one battery is received in the enclosure.

17. The cradle of claim 16, further comprising a connector configured for electrically coupling to the at least one battery when the at least one battery is received in the enclosure and for electrically coupling to an external power or data source.

18. The cradle of claim 1, further comprising a connector electrically coupled to the at least one contact for electrically coupling to an external power or data source.

19. The cradle of claim 1, wherein the at least one contact comprises at least two contacts and the at least one biasing tab comprises two biasing tabs flanking the at least two contacts.

* * * * *